United States Patent
Lai et al.

(10) Patent No.: US 8,085,555 B2
(45) Date of Patent: Dec. 27, 2011

(54) CIRCUIT BOARD MODULE AND CONNECTION PORT THEREOF

(75) Inventors: Chih-Ming Lai, Taipei County (TW); Tse-Hsine Liao, Taipei County (TW); Yung-Shun Kao, Taipei County (TW)

(73) Assignee: Giga-Byte Technology Co., Ltd, Taipei (TW)

( * ) Notice: Subject to any disclaimer, the term of this patent is extended or adjusted under 35 U.S.C. 154(b) by 633 days.

(21) Appl. No.: 12/257,171

(22) Filed: Oct. 23, 2008

(65) Prior Publication Data

US 2010/0103626 A1    Apr. 29, 2010

(51) Int. Cl.
*H02B 1/20*    (2006.01)
(52) U.S. Cl. ........... 361/828; 361/760; 361/728; 439/78
(58) Field of Classification Search ............ 361/728, 361/760, 752, 828; 174/250, 260; 439/78, 439/676, 620
See application file for complete search history.

(56) References Cited

U.S. PATENT DOCUMENTS

| | | | |
|---|---|---|---|
| 5,424,586 A * | 6/1995 | Hattori et al. | 307/10.1 |
| 6,095,837 A | 8/2000 | David et al. | |
| 6,615,272 B1 * | 9/2003 | Ambrose | 709/238 |
| 6,746,250 B2 * | 6/2004 | Blutbacher | 439/34 |
| 7,040,926 B2 * | 5/2006 | Ferentz | 439/620.21 |
| 2006/0009084 A1 | 1/2006 | Zhu et al. | |
| 2006/0234553 A1 * | 10/2006 | Tsai | 439/607 |
| 2007/0059959 A1 | 3/2007 | Chen | |

* cited by examiner

*Primary Examiner* — Yuriy Semenenko
(74) *Attorney, Agent, or Firm* — Chun-Ming Shih

(57) ABSTRACT

A connection port and a circuit board module employing such a connection port are provided. The circuit board module includes a circuit board, a plurality of electronic components, a switch, a control unit connected to the switch, and a connection port. The electronic components, the switch, the control unit and the connection port are disposed on the circuit board. The connection port is adapted for connecting with a connector. The connection port includes a body, a plurality of first connection terminals for connecting with the connector, and a detection terminal. Each of the first connection terminals has one end connected to the control unit via the switch. The detection terminal has one end connected with the switch of the circuit board module. When another end of the detection terminal gets in contact with the connector, the switch electrically conducts the first connection terminals with the control unit.

12 Claims, 3 Drawing Sheets

CIRCUIT BOARD MODULE AND CONNECTION PORT THEREOF

BACKGROUND OF THE INVENTION

1. Field of the Invention

The present invention generally relates to a connection apparatus and a circuit board module, and more particularly, to a connection port and a circuit board module employing such a connection port.

2. Description of Related Art

In accordance with the development of science and technology, as well as the popularization of computer systems, more and more modern people are now used to operating computers for processing documents, browsing internet, playing audio/video files, or storing data. In this manner, computer systems have already become necessary tools for people's work and daily lives.

Computers, no matter desktop types or notebook types, all include circuit boards. A typical circuit board usually contains different types of electronic components responsible for different functions. Further, such a circuit board often includes some connection ports for connecting to a keyboard, a mouse, a USB drive, or other computer peripheral equipment.

A computer peripheral equipment usually includes a connector for connecting with the connection port. Generally, no mater being connected with a connector or not, the connection port is maintained electrified, which causes unnecessary waste of power.

SUMMARY OF THE INVENTION

Accordingly, the present invention is directed to provide a connection port including a connection terminal, which is electrified only when connected with a connector.

The present invention further provides a circuit board module including a connection port.

The present invention provides a connection port, disposed on a circuit board of a circuit board module for connecting with a connector. The connection port includes a body, a plurality of first connection terminals for connecting with the connector, and a detection terminal. The body is assembled on the circuit board. The first connection terminals are disposed on the body. Each of the first connection terminals has one end connected to a control unit of the circuit board module via a switch of the circuit board module. The detection terminal is disposed on the body. The detection terminal has one end being connected to the switch of the circuit board module, and when another end of the detection terminal gets in contact with the connector, the switch electrically conducts the first connection terminals to the control unit.

The present invention further provides a circuit board module. The circuit board module includes a circuit board, a plurality of electronic components, a switch, a control unit, and a connection port. The electronic components, the switch, the control unit and the connection port are all disposed on the circuit board. The control unit is connected to the switch. The connection port is adapted for connecting with a connector. The connection port includes a body, a plurality of first connection terminals for connecting with the connector, and a detection terminal. The body is assembled on the circuit board. The first connection terminals and the detection terminal are disposed on the body. Each of the first connection terminals has one end connected to the control unit via the switch. The detection terminal has one end connected with the switch of the circuit board module, and when another end of the detection terminal gets in contact with the connector, the switch electrically conducts the first connection terminals with the control unit.

According to an embodiment of the present invention, the end of the detection terminal for getting in contact with the connector is a spring strip.

According to an embodiment of the present invention, the body is configured with a recess, for accommodating the connector.

According to an embodiment of the present invention, the first connection terminals are adapted for transmitting signals compatible with the 1394 protocol.

According to an embodiment of the present invention, the connection port further includes a plurality of second connection terminals, for transmitting signals compatible with the universal serial bus (USB) protocol.

According to an embodiment of the present invention, the switch is a mechanical switch.

According to an embodiment of the present invention, the switch is an electronic switch.

In a connection port and a circuit board module according to the present invention, when the connection port is disconnected from the connector, the connection terminals are maintained at a non-conductive status for saving power. When the connection port is in connection with the connector, the switch conducts the connection terminals with the control unit so as to allow the connection terminals to be used.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
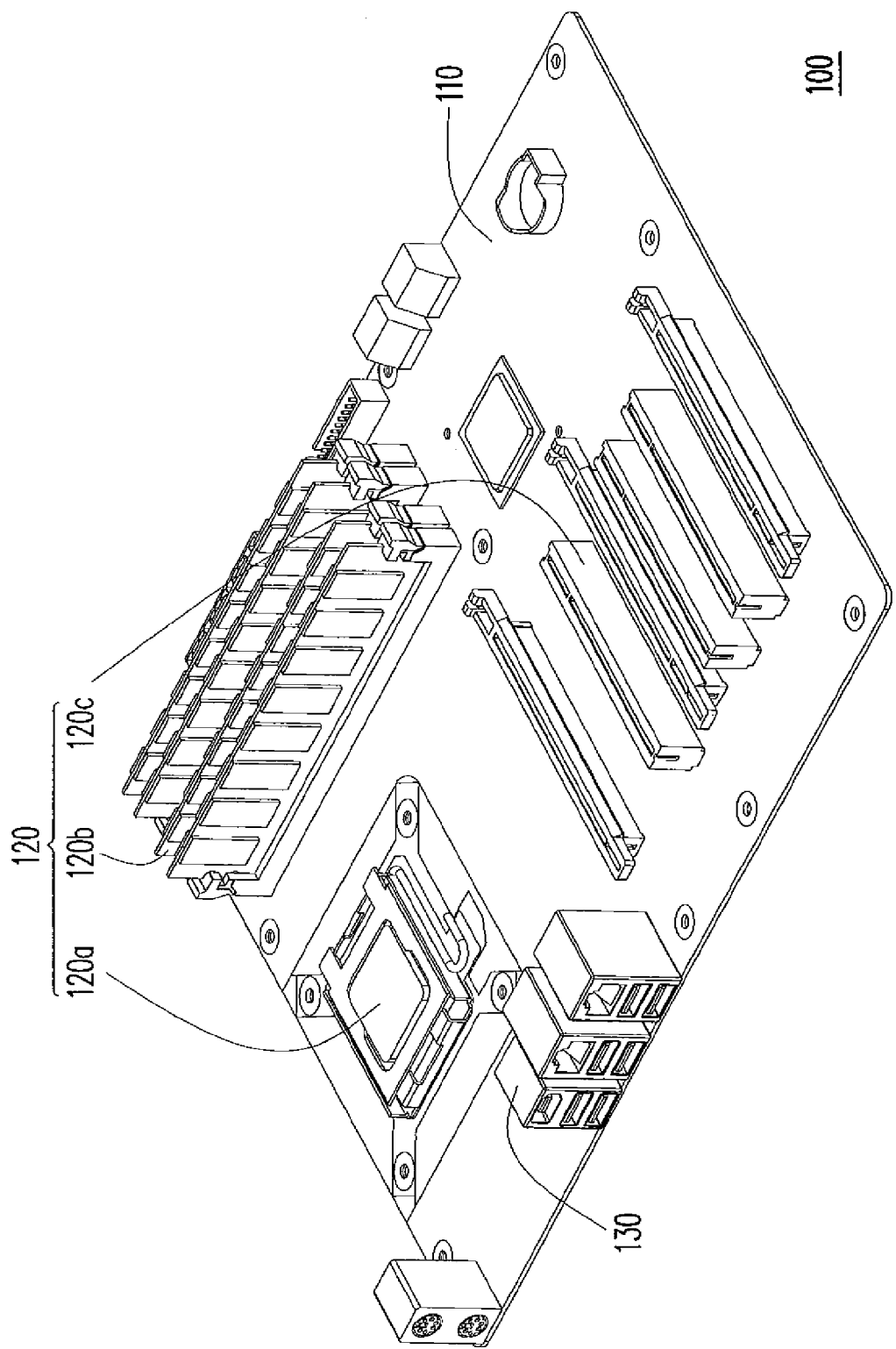
FIG. 1 is an isometric view of a connection port employed in a circuit board module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an isometric view of a connection port employed in a circuit board module according to an embodiment of the present invention. Referring to FIG. 1, the current embodiment depicts a circuit board module 100. The circuit board module 100 includes a circuit board 110, a plurality of electronic components 120, a switch 140, a control unit 150, and a connection port 130. The electronic components 120 are disposed on the circuit board 110. The switch 140 is disposed on the circuit board 110. The control unit 150 is disposed on the circuit board 110 and is connected with the switch 140. The connection port 130 is disposed on the circuit board 110, for connecting to a connector 50 (shown in FIG. 2).

The electronic components 120 of the circuit board module 100 for example include a central processing unit (CPU) 120a, a memory 120b, an interface car slot 120c. The circuit board module 100 may further includes a heat sink or a heat dissipation fan (not shown), etc.

Figure 2:
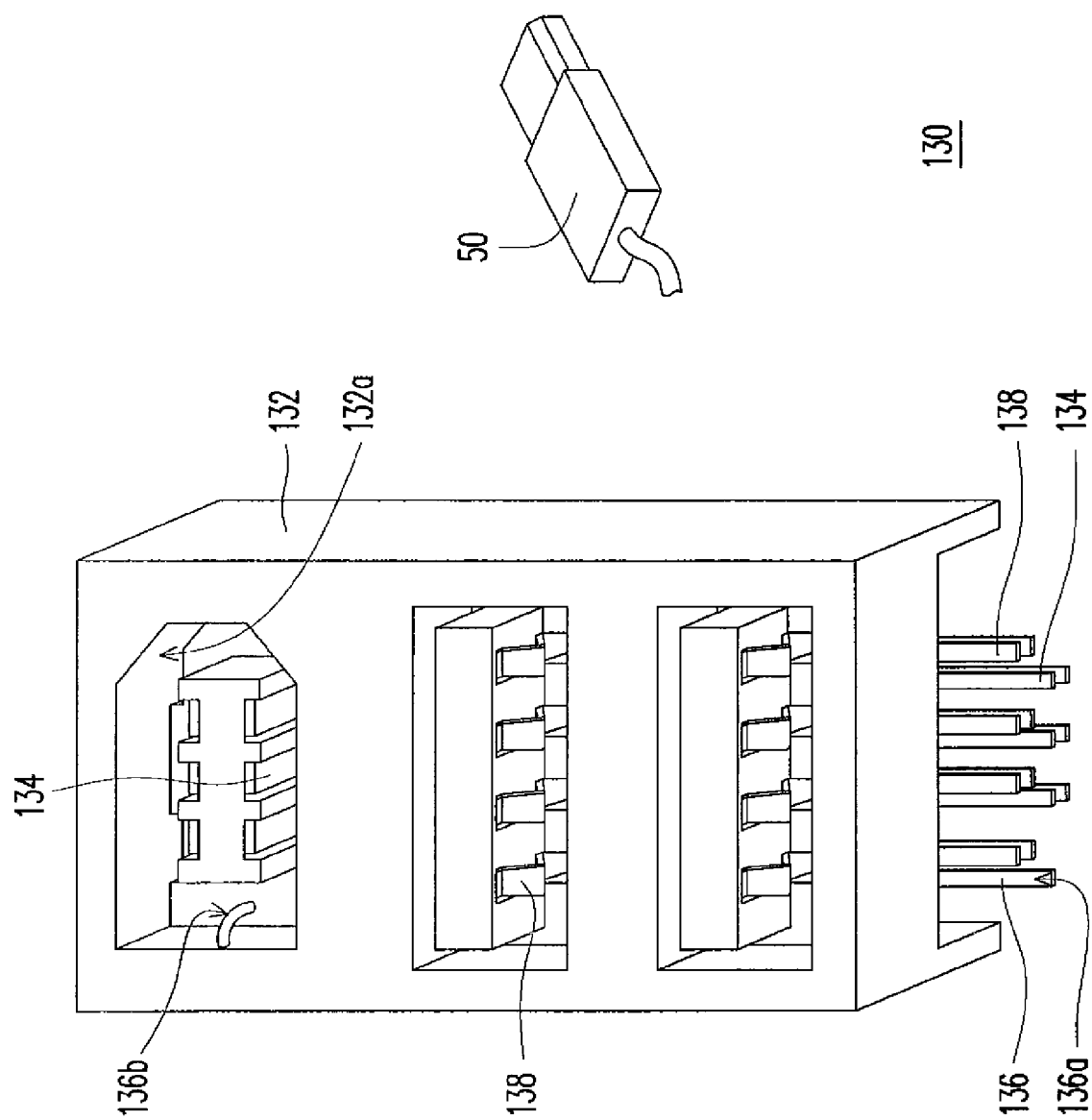
FIG. 2 is an isometric view of the connection port of FIG. 1.

FIG. 2 is an isometric view of the connection port of FIG. 1. Referring to FIG. 2, the connection port 130 includes a body 132, a plurality of connection terminals 134 and a detection terminal 136. The body 132 is assembled to the circuit board 110. The first connection terminals 134 and the detection terminal 136 are disposed on the body 132.

Figure 3:
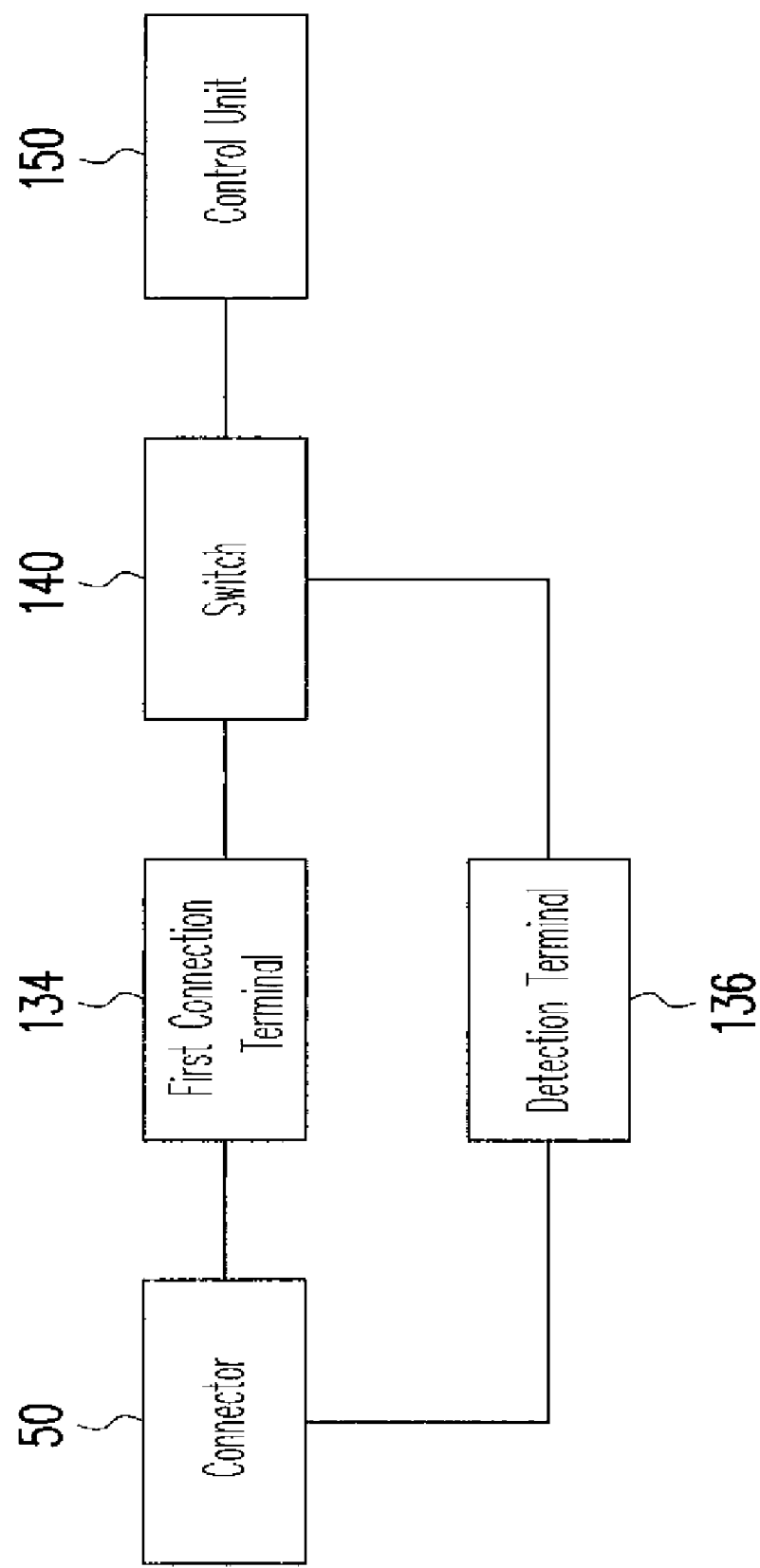
FIG. 3 is a block diagram illustrating some components of the circuit board module of FIG. 1.

FIG. 3 is a block diagram illustrating some components of the circuit board module of FIG. 1. Referring to FIGS. 2 and 3, each of the first connection terminals 134 is connected to the control unit 150 via the switch 140, the first connection terminals 134 are used for connecting with the connector 50. The detection terminal 136 has one end 136a connected with the switch 140 of the circuit board module 100. When another end 136b of the detection terminal 136 gets in contact with the connector 50, the detection terminal 136 triggers the switch 140 to electrically conduct the first connection terminals 134 with the control unit 150. It should be noted that when the detection terminal 136 is not in contact with the connector 50, the first connection terminals 134 are not conducted and not electrified.

Referring to FIG. 2, in the current embodiment, the body 132 is configured with a recess 132a, for accommodating the connector 50, so as to allow the first connection terminals 134 and the detection terminal 136 to get in contact with the connector 50. The detection terminal 136 for example is adapted to get in contact with a metal housing of connector 50, or get in contact with a non-metal portion of the connector 50. The end 136b of the detection terminal 136 for getting in contact with the connector 50 is exposed from the body 132 and is positioned in the recess 132a. The end 136b of the detection terminal 136 for getting in contact with the connector 50 for example is a spring strip.

In the current embodiment, the first connection terminals 134 for example are adapted for transmitting signals compatible with the 1394 protocol, and are connected with computer peripheral equipment (not shown) having a 1394 connector. Further, the connection port 130 further includes a plurality of second connection terminals 138, for transmitting signals compatible with the universal serial bus (USB) protocol. The second connection terminals 138 are connected with computer peripheral equipment having a USB connector. It should be noted, in the current embodiment, the switch 140 can be either a mechanical switch, or an electronic switch. Further, the detection terminal 136 is not restricted to be made of a metal material. For example, when the switch 140 is an electronic switch, the switch 140 can electrically connect the first connection terminals 134 with the control unit 150, or disconnect the first connection terminals 134 from the control unit 150, according to a potential variation of the detection terminal 136.

In summary, in a connection port and a circuit board module according to the present invention, when the connection port is disconnected from the connector, the connection terminals are maintained at a non-conductive status for saving power. When the connection port is in connection with the connector, the detection terminal of the connection port triggers the switch to conduct the connection terminals with the control unit so as to electrify the connection terminals for using. Further, other functions of the circuit board module can also be triggered by the contact between the detection terminal and the connector.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A connection port, disposed on a circuit board of a circuit board module, for connecting with a connector, the connection port comprising:
    a body, assembled on the circuit board;
    a plurality of first connection terminals, disposed on the body for connecting with the connector, wherein each of the first connection terminals has one end connected to a control unit of the circuit board module via a switch of the circuit board module; and
    a detection terminal, disposed on the body, wherein the detection terminal has one end connected with the switch of the circuit board module, and when another end of the detection terminal gets in contact with the connector, the switch electrically conducts the first connection terminals with the control unit.

2. The connection port according to claim 1, wherein the end of the detection terminal which gets in contact with the connector is a spring strip.

3. The connection port according to claim 1, wherein the body is configured with a recess, for accommodating the connector.

4. The connection port according to claim 1, wherein the first connection terminals are adapted for transmitting signals compatible with a 1394 protocol.

5. The connection port according to claim 1, wherein the connection port comprises a plurality of second connection terminals, for transmitting signals compatible with a universal serial bus (USB) protocol.

6. A circuit board module, comprising:
    a circuit board;
    a plurality of electronic components, disposed on the circuit board;
    a switch, disposed on the circuit board;
    a control unit, disposed on the circuit board and connected to the switch; and
    a connection port, disposed on the circuit board for connecting with a connector, the connection port comprising:
        a body, assembled on the circuit board;
        a plurality of first connection terminals, disposed on the body for connecting with the connector, wherein each of the first connection terminals has one end connected to the control unit via the switch; and
        a detection terminal, disposed on the body, wherein the detection terminal has one end connected with the switch of the circuit board module, and when another end of the detection terminal gets in contact with the connector, the switch electrically conducts the first connection terminals with the control unit.

7. The circuit board module according to claim 6, wherein the end of the detection terminal which gets in contact with the connector is a spring strip.

8. The circuit board module according to claim 6, wherein the body is configured with a recess, for accommodating the connector.

9. The circuit board module according to claim 6, wherein the first connection terminals are adapted for transmitting signals compatible with a 1394 protocol.

10. The circuit board module according to claim 6, wherein the connection port comprises a plurality of second connection terminals, for transmitting signals compatible with a universal serial bus (USB) protocol.

11. The circuit board module according to claim 6, wherein the switch is a mechanical switch.

12. The circuit board module according to claim 6, wherein the switch is an electronic switch.

* * * * *